United States Patent [19]

Ponton et al.

[11] Patent Number: 5,177,781
[45] Date of Patent: Jan. 5, 1993

[54] DIALING PULSE SIGNATURE RECOGNIZING METHOD AND DEVICE

[75] Inventors: Michel Ponton, Laval; Yves Lemieux, Montréal; Normand Girard, Repentigny; Marc Gareau, Montréal, all of Canada

[73] Assignee: Teleliaison, Quebec, Canada

[21] Appl. No.: 586,007

[22] Filed: Sep. 21, 1990

[30] Foreign Application Priority Data

Aug. 7, 1990 [CA] Canada ................................. 2022750

[51] Int. Cl.⁵ ........................ H04M 1/00; H04M 3/42
[52] U.S. Cl. .................................... 379/339; 379/102; 379/283
[58] Field of Search ............... 379/102, 104, 105, 281, 379/283, 339, 353, 386, 342, 31, 1, 201

[56] References Cited

U.S. PATENT DOCUMENTS

| | | | |
|---|---|---|---|
| 4,013,838 | 3/1977 | Tsai | 379/281 |
| 4,066,846 | 1/1978 | Champan et al. | 379/386 |
| 4,747,131 | 5/1988 | Beirne | 379/386 |
| 4,771,450 | 9/1988 | Castro et al. | 379/353 |
| 4,782,523 | 11/1988 | Galand et al. | 379/386 |
| 4,868,873 | 9/1989 | Kamil | 379/386 |
| 4,896,346 | 1/1990 | Belfield et al. | 379/88 |
| 4,924,501 | 5/1990 | Cheeseman et al. | 379/286 |
| 4,944,001 | 7/1990 | Kizuik et al. | 379/386 |

FOREIGN PATENT DOCUMENTS 212894 12/1982 Japan ................................. 379/353

Primary Examiner—James L. Dwyer
Assistant Examiner—Ahmad F. Matar
Attorney, Agent, or Firm—Longacre & White

[57] ABSTRACT

A method and device for recognizing a signature of dialing pulse present in a communication signal isolate from the latter signal the signature. The so isolated signature is correlated with a statistic model obtained from a large number of dialing pulse signatures to determine whether the isolated signature corresponds to a dialing pulse. During this correlation, a first complex function representative of the isolated signature is calculated and correlated with a second complex function representative of the statistic model. The result of the correlation is normalized and whether the isolated signature is a signature of dialing pulse is decided in function of this normalization. The method and device can be used to convert into a tone frequency signal a series of dialing pulse signatures present in the communication signal and corresponding to a dialed digit. Each recognized signature is counted in order to determine the number of signatures in the series and a tone signal having a frequency which is function of this counted number is generated.

15 Claims, 2 Drawing Sheets

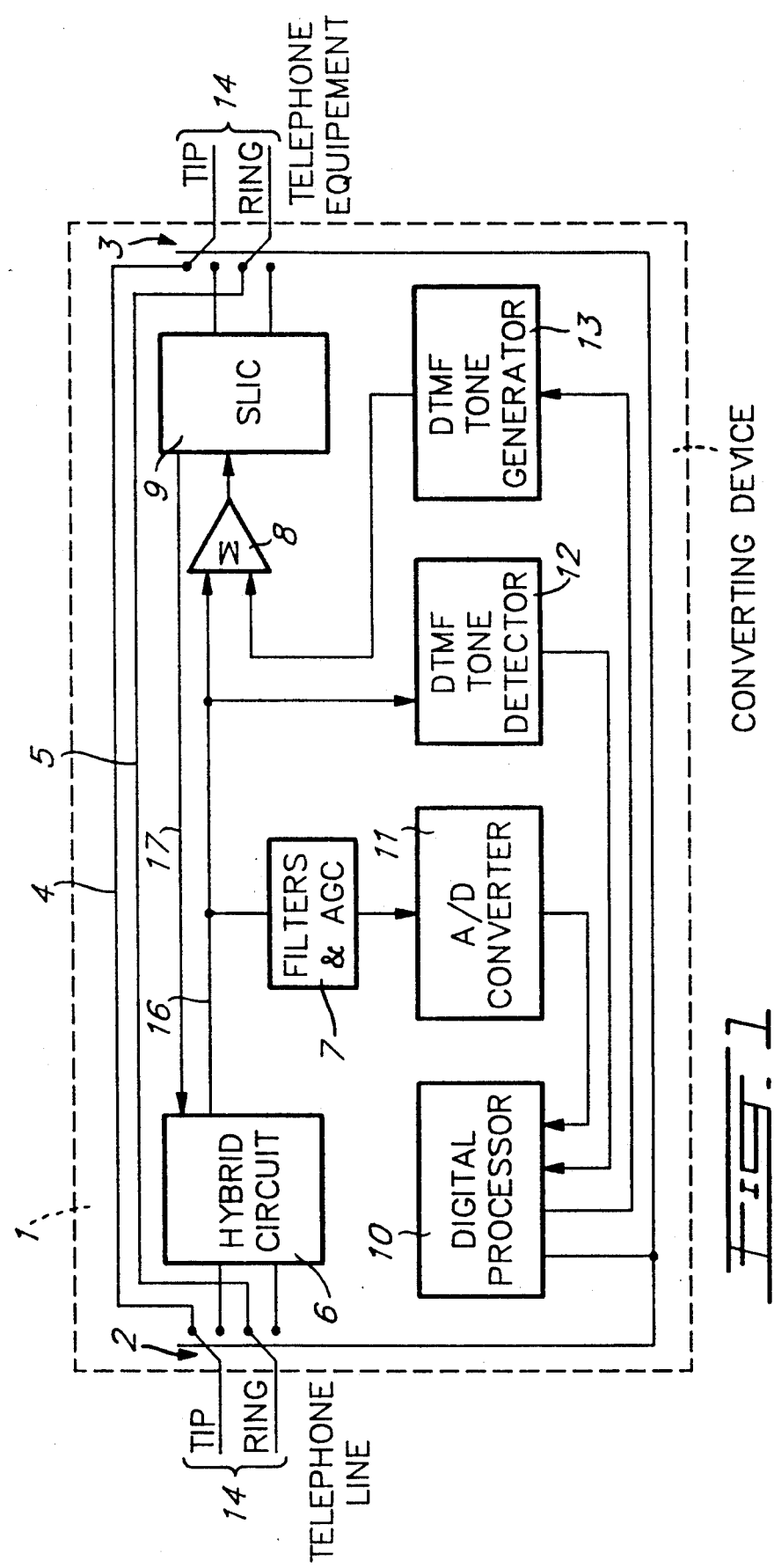

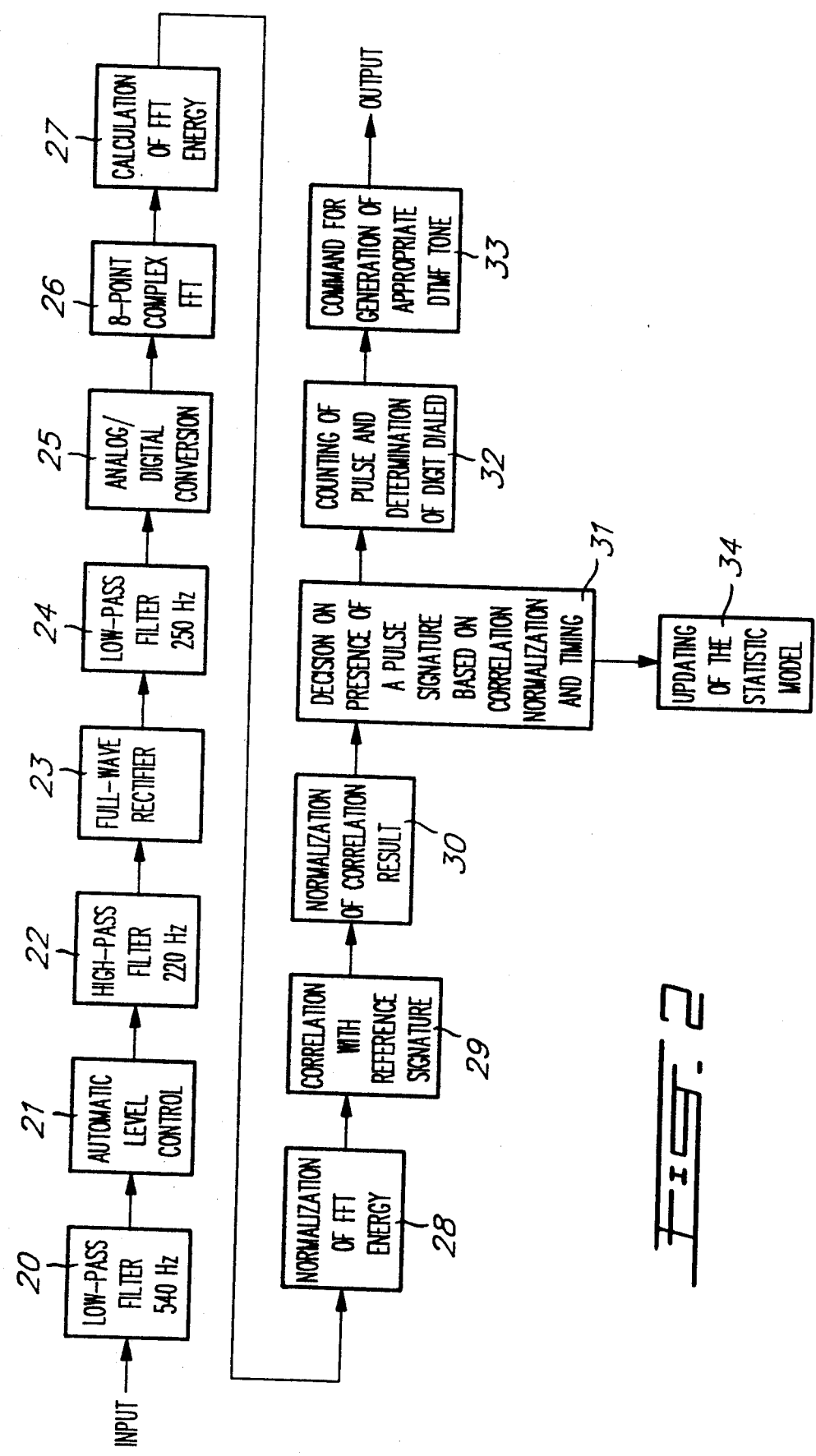

DIALING PULSE SIGNATURE RECOGNIZING METHOD AND DEVICE

BACKGROUND OF THE INVENTION

1. Field of the Invention

The present invention relates to a method and device for recognizing in a communication signal the audio signatures of dialing pulses corresponding to a dialed digit. The invention also extends to a method and device for converting into a tone frequency signal a series of dialing pulse signatures to thereby enable a caller to adequately control by pulse dialing a remotely controllable equipment connected to a telephone line.

2. Brief Description of the Prior Art

Most of the equipements remotely controllable through the telephone network operates satisfactorily only with DTMF (Digital Tone Modulation Frequency) tone dialing, that is Touch-Tone (trademark) dialing. With DTMF tone dialing, each digit dialed produces on an already established telephone connection a tone having a predetermined, associated frequency which can be recognized by the remotely controllable equipement. After the caller has reached the desired subscriber's telephone number, he has only to depress one or many push buttons of his telephone set and the remote controlled equipement recognizes the so produced tones to perform the desired operation, in particular but not exclusively to establish a line connection between the caller and a given person or service.

With pulse dialing, each digit dialed produces one pulse (digit 1) or a series of pulses (digits 2-0) on an already established telephone connection. This is the case for example with telephone sets comprising a conventional rotating dial. The pulses are produced by closing and opening the loop formed by the telephone line of the caller and the pulses are therefore not transmitted beyond the first telephone station. Beyond that station, only the noise, that is the audio signature of each pulse, is propagated. As this signature somewhat varies from one pulse to the other, it is not trivially recognizable by remotely controllable equipements.

OBJECTS OF THE INVENTION

A first object of the invention is therefore a method and device capable to recognize the audio signatures of dialing pulses produced on an already established telephone connection.

Another object of the present invention is a method and device capable to convert into a tone frequency signal a series of dialing pulse signatures to thereby enable a caller to adequately control by pulse dialing a remotely controllable equipment connected to a telephone line.

SUMMARY OF THE INVENTION

More specifically, in accordance with the present invention, there is provided a method for recognizing a signature of dialing signal present in a communication signal, comprising the steps of isolating the signature from the communication signal, and correlating the so isolated signature with a statistic model of the signature obtained from a large number of dialing signal signatures to determine whether the isolated signature corresponds to a dialing signal.

If the communication signal is an audio signal and the dialing signal a dialing pulse, the signature isolating step may comprise (a) low-pass filtering the audio signal with a transition frequency of about 540 Hz, (b) automatically adjusting the amplitude level of the low-pass filtered signal to a predetermined level, (c) high-pass filtering the signal at this predetermined amplitude level with a transition frequency of about 220 Hz, (d) full-wave rectifying the high-pass filtered signal, and (e) again low-pass filtering the full-wave rectified signal with a transition frequency of about 250 Hz.

In accordance with preferred embodiments of the present invention, the correlating step comprises (a) calculating a first complex function representative of the isolated signature with the following expression:

$$S[x(n)] = X(k) = \sum_{n=0}^{7} x(n) W_8^{nk}$$

where x(n) are digital samples of the isolated signature, $$k = 1, 2, 3, 4, 5, 6 \text{ and } 7, \text{ and } W = e^{-\frac{j2\pi}{8}}.$$

(b) calculating the energy of the first complex function with the following expression:

$$E^2 = \sum_{k=0}^{7} |X(k)|^2.$$

(c) normalizing the calculated energy of the first complex function to obtain a value $E_p^2$
(d) correlating the first function with a second function representative of the statistic model using the following expression:

$$Y^2 = \sum_{k=0}^{7} X(k) \cdot REF^*(k)$$

where $$REF(k) = \sum_{n=0}^{7} r(n) W_8^{nk}$$

and r(n)=n samples of a reference dialing pulse signature, (e) normalizing the result of the correlation of the first function with the second function using the following expression:

$$Y_n^2 = \frac{Y^2}{E_p^2},$$

and (f) deciding whether the isolated signature is effectively a signature of dialing signal in function of the result of the latter normalization.

In accordance with the present invention, there is further provided a device for recognizing a signature of dialing signal present in a communication signal, comprising means for isolating the signature from the communication signal, and means for correlating the so isolated signature with a statistic model of said signature obtained from a large number of dialing signal signatures to determine whether the isolated signature corresponds to the dialing signal.

The present invention also encompasses a method of converting into a tone frequency signal a series of dialing pulse signatures present in a communication signal and corresponding to a dialed digit, comprising the steps of isolating each pulse signature from the communication signal, correlating each isolated signature with a statistic model of said signature obtained from a large number of dialing pulse signatures to determine whether the said isolated signature is effectively a dialing pulse signature, counting each isolated signature recognized as being effectively a dialing pulse signature to determine the number of pulse signatures in the series, and generating a tone frequency signal having a frequency which is function of the number of pulse signatures in the series.

The subject invention further relates to a device for converting into a tone frequency signal a series of dialing pulse signatures present in a communication signal and corresponding to a dialed digit, comprising means for isolating each pulse signature from the communication signal, means for correlating each isolated signature with a statistic model of said pulse signature obtained from a large number of pulse signatures to determine whether the isolated signature is effectively a dialing pulse signature, means for counting each isolated signature recognized as being effectively a dialing pulse signature to determine the number of pulse signatures in the series, and means for generating a tone frequency signal having a frequency which is function of the number of pulse signatures in the series.

The objects, advantages and other features of the present invention will become more apparent upon reading of the following non restrictive description of a preferred embodiment thereof, given by way of example only with reference to the accompanying drawings.

BRIEF DESCRIPTION OF THE DRAWINGS

In the appended drawings:

FIG. 1 is a schematic block diagram of a converting device in accordance with the present invention; and FIG. 2 is a flow chart of the sequence of operations carried out by the converting device of FIG. 1.

DETAILED DESCRIPTION OF THE PREFERRED EMBODIMENT

The block diagram of FIG. 1 shows a converting device in accordance with the present invention, generally identified by the reference numeral 1 and comprising a pair of relays 2 and 3, a pair of wires 4 and 5, an hybrid circuit 6, a filter and AGC (Automatic Gain Control) circuit 7, an adder 8, a SLIC (Station Line Interface Circuit) 9, a digital processor 10, an A/D (analog-to-digital) converter 11, a DTMF tone detector 12, and a DTMF tone generator 13.

The converting device 1 is connected in series with a two-wire incoming telephone line 14, connected to a remotely controllable telephone equipment (not shown).

If the telephone line is used by the subscriber to call another person or to converse with another person, or for any other purpose which does not require the operation of the remotely controllable equipment, the processor 10 positions the relays 2 and 3 as shown in FIG. 1 to interconnect the tip and ring wires of the line 14 through the pair of wires 4 and 5. The converting unit 1 is then transparent to the surrounding.

If the remotely controllable equipment seizes the line 14 for example after a given number of ringing sequences, the processor 10 detects such seizure to control the relays 2 and 3 so as to connect the tip and ring wires on the line side to the hybrid circuit 6, and also to connect the tip and ring wires on the equipment side to the SLIC circuit 9.

The hybrid circuit is then connected directly to the incoming telephone line 14. Its function is to separate the bidirectional communication on the two-wire telephone line 14 into distinct ingoing 16 and outgoing 17 two-wire lines (four-wire circuit). The hybrid circuit 6 is required due to the important difference in amplitude level between the incoming and outgoing communication signals.

The function of the SLIC circuit 9 is to transform the incoming and outgoing lines 16 and 17 again into a two-wire bidirectional telephone line (line 14) which can then be connected to any standard telephone equipment.

The function of the filter and AGC circuit 7 is to isolate as much as possible the main frequency components of the incoming dialing pulse signatures from unwanted frequency components, such as voice signals. As illustrated in FIG. 2, the signal on line 16 first traverses a low-pass filter (step 20) with a transition frequency of 540 Hz. The AGC (step 21) uses a 10 msec attack/release time constant to prevent it from adjusting its gain in response to transitory high or low amplitudes of the low-pass filtered signal. The maximum gain of the AGC is 15 dB. This allows the AGC to attenuate abnormally strong voice signals while leaving unaffected the incoming pulse signatures. Of course, the AGC automatically adjusts the amplitude level of the low-pass filtered signal to an adequate, predetermined amplitude level. The signal from the AGC is then passed through a high-pass filter (step 22) with a transition frequency of 220 Hz. Indeed, the frequencies of interest of the dialing pulse signatures are situated between 220 and 540 Hz. The high-pass filtered signal is full-wave rectified (step 23) and the so rectified signal traverses a fourth-order low-pass filter (step 24) with a transition frequency of 250 Hz to radically eliminate the frequencies higher than 250 Hz and supply a suitable signal to the A/D converter 11.

After the incoming dialing pulse signature has been isolated and pre-processed, it is ready for digitalization. As will be seen hereinafter, this will enable the processor 10 to extract pertinent information revealing the presence or absence of a dialing pulse signature in a sequence of samples. The signal produced at the output of the circuit 7 is supplied to the A/D converter 11 and is accordingly converted (step 25) into digital samples supplied to the processor 10. The analog-to-digital conversion is given by the expression $x(t) \rightarrow x(n)$ with a sampling period $\tau$ of 1.8 msec.

The digital processor 10 performs a digital signal processing (DSP) of the incoming samples from the converter 11 to calculate the necessary data. It stores a decision-making algorithm to choose or not to recognize a signature as a valid dialing pulse signature, and if so, it counts the signature and sends a command to the generator 13 to produce the appropriate DTMF tone.

The flow chart of FIG. 2 details the operations performed by the processor 10. In response to the received digital samples from the A/D converter 11, it first calculates (step 26) a first 8-point complex function given by the following expression:

$$S[x(n)] = X(k) = \sum_{n=0}^{7} x(n) W_8^{nk}$$

where

-continued $$k = 0, 1, 2, 3, 4, 5, 6 \text{ and } 7, \text{ and } W = e^{-\frac{j2\pi}{8}}$$

In step 27, the energy of the first function is calculated using the following expression:

$$E^2 = \sum_{k=0}^{7} |X(k)|^2$$

The so calculated energy is normalized (step 28) and the so normalized energy $E_p^2$ is chosen as the appropriate energy for the first complex function. During this normalization, the energy of the first function is compared to energies of the same function precedently calculated. If the newly calculated energy is higher, it is chosen as the normalized energy. If it is lower, the normalized energy is reduced but this reduction in energy cannot exceed a value given by a curve. Also, the normalized energy cannot be lower than a predetermined minimum value.

Step 29 consists of correlating the function X(k) with a second 8-point complex function representative of a statistic model for the dialing pulse signatures obtained from a large number of dialing pulse signatures. This correlation is made using the following expression:

$$Y^2 = \sum_{k=0}^{7} X(k) \cdot REF^*(k)$$

where $$REF(k) = \sum_{n=0}^{7} r(n) W_8^{nk}$$

is the second function and r(n)=eight samples of a reference dialing pulse signature. The eight samples of the reference signature are obtained statistically, by averaging the eight samples of a large number of such signatures.

The resulting correlation is normalized (step 30) using the expression:

$$Y_n^2 = \frac{Y^2}{E_p^2}$$

Based on the result of the normalized correlation and timing, the processor 10 decides (step 31) whether we are in presence of a dialing pulse signature. If we are in presence of a pulse, the latter is counted (step 32). Counting of the pulse signatures in a series enables the digital processor 10 to determine which digit has been dialed and to command (step 33) the generator 13 to produce the correct DTMF tone.

Indeed, once the digital processor 10 has recognized a series of pulse signatures as being a dialed digit, a command is sent to the generator 13 to to produce the appropriate DTMF tone. The so generated tone will be added to the incoming signal on the line 16 through the adder 8. The generated tone can then reach the telephone equipment through the SLIC circuit 9 and the line 14.

The processor 10 can also be programmed to analyse all the dialing pulse signatures received and decoded, to thereby generate an improved statistic model of the signatures (step 34).

When a caller sends a DTMF tone on the incoming line 14, for example by means of a Touch-Tone telephone set, the latter telephone set usually mutes its microphone. The muting swith used for that purpose sometimes produces transients very similar to a signal generated during normal pulse dialing. In order to prevent false detection of a digit "1", the DTMF tone decoder 12 detects the sent DTMF tone to temporarily "blind" the processing of digital processor 10. Accordingly, when a caller wants to control the equipment through a Touch-Tone telephone set, the produced DTMF tones are transmitted directly to the equipment through the line 16, adder 8, SLIC circuit 9 and line 14. The device 1 is therefore transparent to the users of Touch-Tone telephone sets.

An advantage of the method and device of the present invention is that the audio signatures are recognized even when the caller and/or receiver are speaking. Also experimental results show that the audio signatures are recognized with a success of 90–95%.

Although the present invention has been described hereinabove by way of a preferred embodiment thereof, such an embodiment can be modified at will, within the scope of the appended claims, without departing from the spirit and nature of the subject invention.

The embodiments of the invention in which an exclusive property or privilege is claimed are defined as follows:

1. A method for recognizing a signature of dialing signal present in a communication signal, comprising the steps of:
    storing a statistic model of said signature previously obtained from a large number of dialing signal signatures present in communication signals;
    isolating said signature from said communication signal; and
    correlating said isolated signature with said statistic model to determine whether said isolated signature corresponds to said dialing signal, said correlating step comprising calculating a first complex function representative of said isolated signature and correlating said first function with a second complex function representative of the statistic model.

2. A signature recognizing method as defined in claim 1, in which the signature isolating step comprises automatically adjusting the amplitude level of the isolated signature to a predetermined level.

3. A signature recognizing method as defined in claim 1, wherein said communication signal is an audio signal and said dialing signal is a dialing pulse, and wherein said signature isolating step comprises the steps of:
    low-pass filtering the audio signal with a transition frequency of about 540 Hz;
    automatically adjusting the low-pass filtered signal to a predetermined amplitude level;
    high-pass filtering the signal at said predetermined amplitude level with a transition frequency of about 220 Hz;
    full-wave rectifying the high-pass filtered signal; and
    again low-pass filtering the full-wave rectified signal with a transition frequency of about 250 Hz.

4. A signature recognizing method as defined in claim 1, wherein the said step of correlating the isolated signature with a statistic model further comprises calculating the energy of said first function, normalizing the so calculated energy, normalizing the result of the correlation of the first function with the second function using the said normalized energy, and deciding in accordance with the result of the normalization of the correlation of the first function with the second function whether the isolated signature is a signature of dialing signal.

5. A signature recognizing method as defined in claim 4, wherein the isolated signature is an analog signature, wherein the first function calculating step comprises converting the analog signature into digital samples and calculating the first function using the following expression:

$$S[x(n)] = X(k) = \sum_{n=0}^{7} x(n) W_8^{nk}$$

where x(n) are digital samples of the analog signature, $k = 1, 2, 3, 4, 5, 6$ and $7$, and $W = e^{-\frac{j2\pi}{8}}$ 6. A signature recognizing method as defined in claim 5, wherein the first function is correlated with the second function using the following expression:

$$Y^2 = \sum_{k=0}^{7} X(k) \cdot REF^*(k)$$

where $$REF(k) = \sum_{n=0}^{7} r(n) W_8^{nk}$$

and r(n)=n samples of a reference dialing signal signature obtained statistically from said large number of dialing signal signatures.

7. A signature recognizing method as defined in claim 6, in which the energy of the first complex function is calculated using the following expression:

$$E^2 = \sum_{k=0}^{7} |X(k)|^2$$

8. A signature recognizing method as defined in claim 7, wherein the normalized energy $E_p^2$ of the first complex function is related to at least one precedent value of the said normalized energy $E_p^2$.

9. A signature recognizing method as defined in claim 8, wherein the result of the correlation of the first function with the second function is normalized using the following expression:

$$Y_n^2 = \frac{Y^2}{E_p^2}$$

10. A device for recognizing a signature of dialing signal present in a communication signal, comprising:
means for storing a statistic model of said signature previously obtained from a large number of dialing signal signatures present in communication signals;
means for isolating said signature from said communication signal; and
means for correlating the isolated signature with said statistic model to determine whether said isolated signature corresponds to said dialing signal, said correlating means comprising means for calculating a first complex function representative of said isolated signature and means for correlating said first function with a second complex function representative of the statistic model.

11. A signature recognizing device as defined in claim 10, in which the signature isolating means comprises an automatic gain control circuit for adjusting the amplitude level of the isolated signature to a predetermined amplitude level.

12. A signature recognizing device as defined in claim 10, wherein said communication signal is an audio signal and said dialing signal is a dialing pulse, and wherein said signature isolating means comprises:
a first low-pass filter for filtering the audio signal, said first low-pass filter having a transition frequency of about 540 Hz;
an automatic gain control circuit for automatically adjusting the low-pass filtered signal to a predetermined amplitude level;
a high-pass filter for filtering the signal at said predetermined amplitude level, said high-pass filter having a transition frequency of about 220 Hz;
a full-wave rectifying means for rectifying the high-pass filtered signal; and
a second low-pass filter for filtering the full-wave rectified signal, said second low-pass filter having a transition frequency of about 250 Hz.

13. A signature recognizing device as defined in claim 10, wherein the said means for correlating the isolated signature with a statistic model comprises means for normalizing the result of the correlation of the first function with the second function, and means for deciding in accordance with the result of the normalization of the correlation of the first function with the second function whether the isolated signature is a signature of dialing signal.

14. A method of converting into a tone frequency signal a series of dialing pulse signatures present in a communication signal and corresponding to a dialed digit, comprising the steps of:
storing a statistic model of said dialing pulse signatures previously obtained from a large number of dialing pulse signatures present in communication signals;
isolating each pulse signature from said communication signal;
correlating each isolated signature with said statistic model to determine whether said isolated signature is effectively a dialing pulse signature, said correlating step comprising calculating a first complex function representative of said isolated signature and correlating said first function with a second complex function representative of the statistic model;
counting each isolated signature recognized as being effectively a dialing pulse signature to determine the number of signatures in the series; and
generating a tone frequency signal having a frequency which is function of the number of pulse signatures in the series.

15. A device for converting into a tone frequency signal a series of dialing pulse signatures present in a communication signal and corresponding to a dialed digit, comprising:
means for storing a statistic model of said dialing pulse signatures previously obtained from a large number of dialing pulse signatures present in communication signals;
means for isolating each pulse signature from said communication signal;

means for correlating each isolated signature with said statistic model to determine whether said isolated signature is effectively a dialing pulse signature, said correlating means comprising means for calculating a first complex function representative of said isolated signature and correlating said first function with a second complex function representative of the statistic model;

means for counting each isolated signature recognized as being effectively a dialing pulse signature to determine the number of pulse signatures in the series; and means for generating a tone frequency signal having a frequency which is function of the number of pulse signatures in the series.

* * * * *